Nov. 7, 1939.   A. H. EMERY   2,178,745
SHOCKPROOF DIAL INDICATOR
Filed May 20, 1938

INVENTOR.
Alfred H. Emery
BY Darby & Darby
ATTORNEYS

Patented Nov. 7, 1939

2,178,745

UNITED STATES PATENT OFFICE 2,178,745

SHOCKPROOF DIAL INDICATOR

Alfred H. Emery, Poughkeepsie, N. Y., assignor to Standard Gage Company, Inc., Poughkeepsie, N. Y., a corporation of New York Application May 20, 1938, Serial No. 208,965

3 Claims. (Cl. 33—172)

This invention relates to a gear driven dial indicator and particularly to a construction thereof whereby the dial indicator mechanism is protected against damage from shock, thus eliminating wear and increasing the life of the instrument.

In many respects this construction is similar to the attachment for dial indicators which is shown in my Patent No. 2,099,930, issued November 23, 1937. However, the construction shown in that patent requires non-standard indicator housings and gear mounting plates and makes it necessary for the manufacturer to provide two sets of parts from one of which shockproof indicators are constructed and from the other of which indicators of the older non-shockproof type are constructed.

An object of the invention is to provide a shockproof indicator, the major portions of the parts of which are identical with corresponding parts of a similar indicator of non-shockproof construction.

Another object of the invention is to provide a construction for an indicator including a rack which is non-rigidly connected to the contact plunger so that in normal use the rack will follow the movements of the plunger and cause a correct reading on the dial, while if the indicator contact plunger is struck a blow or receives a shock, the plunger will move but without transmitting the shock to the rack, either directly or indirectly.

A still further object of the invention is to provide such a construction which retains all the advantages of my indicator shown in the above-mentioned patent, including the primary advantage of eliminating any transmission of shock through a spring as was common in earlier types of so-called shockproof gages.

Other objects and features of the invention will appear from the following description when considered in connection with the appended drawing, in which Figure 1 is a front elevation of a dial indicator embodying the shockproof construction;

Figure 1:
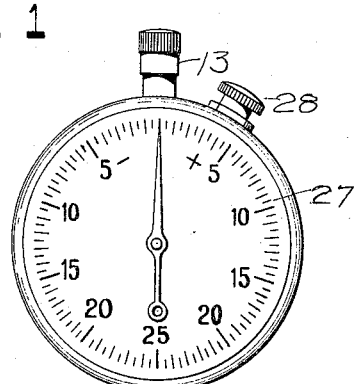

The indicator is composed of a body ring 10 formed with two vertically aligned diametrically opposite tubular bearing stems 11 and 12. The upper stem 12 is provided with a threaded cap 13 which closes the outer end thereof, sealing it against entrance of dirt, grease, etc.

Slidably mounted in the two bearings 11 and 12 is a contact plunger 14 which is provided with a contact member 15 which, as is usual, may be provided with a hardened steel contact plug, or with a diamond contact plug, as desired. The contact plunger is urged downwardly at all times by a spring 16 which extends from a pin in the lower circumference of the ring 10 to a pin 17 fixed to the plunger.

The limits of movement of the contact plunger are determined by a collar 18 fixed to plunger 14 and by an adjustment screw 19 threaded into the upper end of the plunger and adapted to seat against the end of tubular portion 12. Slidably mounted upon the plunger 14 is a rack block 21 having cut in its face the rack teeth 22 which cooperate with mating teeth on the pinion 23 of the usual indicator gear train. The bore of the block may be increased intermediate its ends, as shown, in order to reduce friction between it and the plunger while retaining accurate bearing.

Rack block 21 is constantly urged upwardly by means of a light spring 24 which extends between a pin fixed in the ring 10 and a pin fixed in the rack block. The pin 17 extends through a slot in the rack block 21 and is guided at its outer extremity in a slot in the guide member 26. This pin thus serves to prevent rotation of the contact plunger as well as of the rack block.

Figure 2:
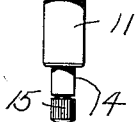
Figure 2 is an enlarged rear view of the dial indicator with the rear cover removed. This view is partly in section to illustrate the shockproof construction and shows the parts in their normal position.

It will be seen, by reference to Figure 2, that in its normal unoperated position the relatively strong spring 16 causes the plunger 14 to be extended. The collar 18 on the plunger bears against the rack block 21 and causes it to lie in its lowermost position with the result that the hand of the indicator rests at a predetermined position, which may be adjusted by means of screw 19. In use the indicator is fixed in position such that a gauging standard raises the contact plunger to some position intermediate its limits of movement, the dial 27 rotated so that the zero point thereon is beneath the hand, and the clamp screw 28 tightened to retain the dial in this position. Thereafter articles to be compared with the standard are successively placed against the contact plunger. As this occurs the plunger is caused to rise and due to tension of the spring 24 the rack block 21 follows the motion of the plunger and remains against collar 18.

Figure 3:
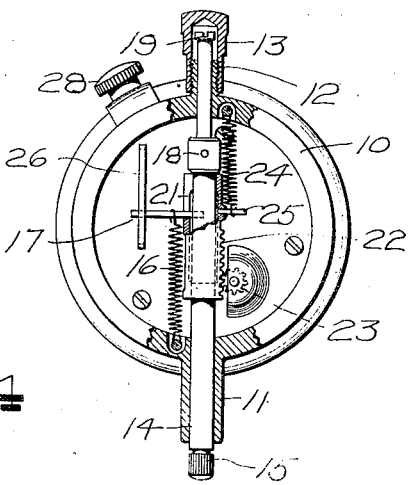
Figure 3 is a view similar to Figure 2 showing the parts in position after operation.

As the block rises the teeth thereof cause rotation of the pinion 23, which results in movement of the hand to give indication of the dimension of the article as compared with the standard. The position of the parts after such normal operation is shown in Figure 3.

Figure 4:
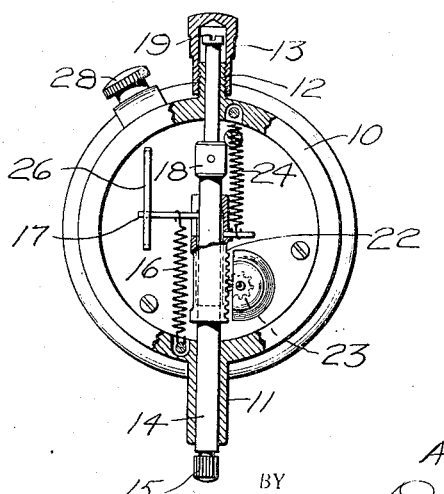
Figure 4 is a view, similar to Figure 2, showing the parts in the positions assumed when the contact plunger has undergone a shock blow.

If the gauge should be used in such a way that contact member 15 is subjected to shock or to a blow, the contact plunger 14 will rise rapidly, as for example to the position shown in Figure 4. Under these circumstances the blow will not be transmitted directly to the gears, since block 21 will not immediately follow the movement of the plunger but will rise to the new position under action of the light spring 24 only.

It will be seen that by using the construction herein set forth, no special counterbore in the stem 12 is made necessary and a standard part such as is used for gauges of non-shockproof construction, shown in Patent No. 1,937,936, issued to Aldeborgh on December 5, 1933, is possible.

In addition, with the construction hereinabove set forth, the pinion 19 may be fixed on a shaft which is carried in a cover plate identical to the cover plate shown in the last mentioned patent so that all parts of the non-shockproof indicator may be used in the construction of the indicator hereinabove described, with the single exception that the contact block is not integral with the contact plunger, as in the earlier construction, but the two are made separately, with the block slidably mounted upon the plunger as described.

While I have described a preferred embodiment of my invention, other constructions are recognized as being possible and, therefore, I do not wish to be limited by the above description but solely by the appended claims.

What I claim is:

1. In a gear driven dial indicator comprising a body member, a contact plunger slidably mounted for movement with respect to said body member, means cooperating with said body member and said plunger for urging said plunger to extended position, a movement transmitting member slidably mounted upon said plunger within the body, resilient means connected with the body of the indicator and with said member for urging said member in a direction opposite to that in which said plunger is urged, and means to limit the movement of said member with respect to said plunger and of said plunger with respect to the body of the indicator.

2. In a gear driven dial indicator comprising a body, a contact plunger slidably mounted for movement with respect to the body of said indicator, means cooperating with the body of the indicator for urging said plunger to extended position, a rack block having teeth cooperating with one of the gears of said indicator slidably mounted upon said plunger within the body of the indicator, resilient means connected with the body of the indicator and said block for urging said block in a direction opposite to that in which the plunger is urged and with lesser strength than the plunger urging means, means to limit the inward movement of said block with respect to said plunger, and means to limit the movement of said plunger in either direction.

3. In a gear driven dial indicator comprising a body and two tubular casing stems, a contact plunger extending therebetween and slidable therein and normally extending beyond one of said stems, means cooperating with the body of the indicator for opposing movement of said plunger from extended position, a rack block slidably mounted upon said plunger within the body of the indicator and having teeth cooperating with one of the gears of the indicator, spring means connected with the body of said indicator and with said rack block to urge said rack block along the plunger in the direction in which movement of the plunger is opposed, and means on said plunger to limit such movement of said rack block whereby if said plunger is rapidly moved from extended position said limiting means moves away from said rack block and said rack block follows such movement being urged by said spring means only and thus imparting no shock to the gear train of said indicator.

ALFRED H. EMERY.